United States Patent
Pihl et al.

(10) Patent No.: US 11,539,944 B2
(45) Date of Patent: Dec. 27, 2022

(54) METHOD AND DEVICE FOR INTRA-CODING AN IMAGE FRAME

(71) Applicant: Axis AB, Lund (SE)

(72) Inventors: Fredrik Pihl, Lund (SE); Malte Johansson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/366,129

(22) Filed: Jul. 2, 2021

(65) Prior Publication Data

US 2022/0078412 A1 Mar. 10, 2022

(30) Foreign Application Priority Data

Sep. 8, 2020 (EP) ..................... 20194958

(51) Int. Cl.
*H04N 19/11* (2014.01)
*H04N 19/159* (2014.01)
*H04N 19/176* (2014.01)
*H04N 19/182* (2014.01)

(52) U.S. Cl.
CPC ........... *H04N 19/11* (2014.11); *H04N 19/159* (2014.11); *H04N 19/176* (2014.11); *H04N 19/182* (2014.11)

(58) Field of Classification Search
CPC .... H04N 19/11; H04N 19/159; H04N 19/176; H04N 19/182
USPC .................................................. 375/240.02
See application file for complete search history.

(56) References Cited

U.S. PATENT DOCUMENTS

| 2011/0002385 | A1 | 1/2011 | Kobayashi |
| 2013/0251279 | A1 | 9/2013 | Park et al. |
| 2014/0247868 | A1 | 9/2014 | Oh et al. |
| 2018/0131964 | A1* | 5/2018 | Min ........................ H04N 19/70 |
| 2020/0021817 | A1 | 1/2020 | Van Der Auwera et al. |
| 2020/0021846 | A1 | 1/2020 | Thoreau et al. |

OTHER PUBLICATIONS

Sugio et al., "AHG6: A threshold for SAO edge offset," Joint Collaborative Team on Video Coding (JCT-VC) of ITU-T SG 16 WP 3 and ISO/IEC JTC 1/SC 29/WG 11, 10th Meeting: Stockholm, SE, (Jul. 2012).

(Continued)

*Primary Examiner* — Nguyen T Truong
(74) *Attorney, Agent, or Firm* — Volpe Koenig (57) ABSTRACT

There is provided an image pipeline and a method therein for intra-coding an image frame. The image pipeline comprises a processing part followed by an encoding part supporting a plurality of intra-prediction modes used for intra-coding image frames. The method comprises receiving an image frame and for at least one block of pixel values in the image frame: predicting pixel values of the at least one block of pixel values using an intra-prediction mode supported by the encoding part and updating the image frame by adjusting at least one pixel value within the at least one block of pixel values so as to reduce a residual between the at least one pixel value and a corresponding predicted pixel value. Further, the method comprises intra-coding the updated image frame using at least one out of the plurality of intra-prediction modes.

15 Claims, 3 Drawing Sheets

(56) References Cited

OTHER PUBLICATIONS

Ye et al., "Improved h.264 intra coding based on bi-directional intra prediction, directional transform, and adaptive coefficient scanning," 2008 15th IEEE International Conference on Image Processing, pp. 2116-2119, (2008).
Extended European Search Report dated Jan. 14, 2021 for European Patent Application No. 20194958.3.

* cited by examiner

Mode 0

Mode 1

Mode 2 (DC)

Fig. 4

METHOD AND DEVICE FOR INTRA-CODING AN IMAGE FRAME

FIELD OF INVENTION

The present invention relates to the field of intra-coding an image frame. In particular, it relates to the processing of the image frame before the intra-coding thereof.

TECHNICAL BACKGROUND

In digital video systems, such as network camera monitoring systems, video sequences are usually compressed before storage or before transmission over a communications network. A reason for compressing the video sequences before storage is to reduce the storage resources needed as compared to the storage resources needed for storing uncompressed video sequences. In correspondence, the video sequences are compressed before transmission in order to reduce the network resources, e.g., network bandwidth, used as compared to the network resources used for transmission of the uncompressed video sequences. In case of limited available network resources, it may even be impossible to transmit the video sequences if not compressed.

The video sequences can be compressed, i.e. encoded by an encoder, using various video encoding methods. In many digital video encoding systems, two main modes are used for compressing image frames of a video sequence: intra mode and inter mode. In this disclosure, the intra mode compression is also referred to as intra-coding and the inter mode compression is in correspondence referred to as inter-coding.

In the intra-coding, the luminance and chrominance channels are encoded by exploiting the spatial redundancy of the pixels in a given channel of a single frame via prediction, transform, and entropy coding. The encoded image frames are called intra-frames and may also be referred to as I-frames or key frames. Within an intra-frame, blocks of pixels or macroblocks comprising a plurality of blocks are encoded in intra-mode, meaning that they are encoded as intra-blocks, i.e. individually, with no references to other blocks.

The inter-coding instead exploits the temporal redundancy between separate image frames and relies on a motion-compensation prediction technique that predicts parts of an image frame from one or more previous image frames by encoding the motion in pixels from one image frame to another for selected blocks of pixels. Especially, the motion vector and the difference in motion between pixels of the image frame and pixels of a reference frame are encoded. The encoded frames are called inter-frames, and may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction. Within an inter-frame, blocks of pixels may be encoded either in inter-mode, meaning that they are encoded with reference to a similar block in a previously decoded image frame, or in intra-mode, meaning that they are encoded as intra-blocks, i.e., individually, with no references to other blocks.

When performing intra-coding of a block of pixels, the encoder will make use of intra-prediction. In intra-prediction the encoder will use values of pixels on top and to the left of the block of pixels to be intra-coded in order to predict the pixel values in the block.

After prediction of the pixel values using one of the intra-prediction modes, the predicted pixel values are subtracted from the real pixel values and the difference (also known as the residual) is quantized and entropy encoded before it is submitted in the bitstream. If the prediction is perfect, there will be no residual. However, in practice there will be a residual that contributes to the size of the intra-coded frame.

Many encoders have different modes for making the intra-prediction and they may choose the intra-prediction mode that gives the smallest residual for a given block of pixels. For example, the compression standard Advanced Video Coding (AVC), sometimes also referred to as H.264, supports 9 different intra-prediction modes, the compression standard High Efficiency Video Coding (HEVC) supports 35 different intra-prediction modes and the compression standard AOMedia Video 1 (AV1) supports 54 different intra-prediction modes.

A drawback with intra-coding image frames as compared to inter-coding of the image frames is that the resulting I-frames have a larger size giving rise to spikes in the bitstream as compared to the inter-coded P-frames. A reason for the larger size of the I-frames is that only spatial redundancies are exploited when performing the intra-coding as compared to the inter-coding of the P-frames wherein both spatial redundancy and temporal redundancy are exploited.

One approach of reducing the size of intra-coded image frames, i.e., I-frames, is described in US 2013/0251279 wherein an adaptive pre-processing scheme is used in the image encoding. In the adaptive pre-processing scheme, blocks of an original image, which blocks have a determined size, are compared to blocks of a reference image (an image for which the pre-processing already has been carried out) and blocks of the reference image are replicated to blocks of the original image when the blocks have a similarity within a threshold. After the replication, the original image frame including the replicated reference blocks is encoded. Thereafter, the encoder evaluates whether the decoded image fulfils the desired quality requirements. If the quality of the decoded image is too low the threshold has to be upwardly controlled so that the pre-processing of an upcoming image does not result in a deteriorated image quality. A drawback with the prior art is that entire blocks of the original image are replaced with entire reference blocks resulting in loss of image information in those parts of the image comprising the replaced blocks. In the end, the resulting image may be useless for some purposes, such as surveillance purposes, due to the loss of image information when many blocks of the original image have been replaced with reference blocks. The prior art also has the drawback of requiring a previously pre-processed image comprising blocks to be used for the comparison and the replication. Further, the need of adjusting the threshold is determined when at least one pre-processed and encoded image of deteriorated quality has been obtained. This results in a delay in the adjustment of the threshold. Furthermore, if the image of deteriorated quality is not to be transmitted to a receiver, the original image has to be pre-processed again using the new threshold resulting in a deteriorated compression efficiency.

Thus, there is room for improvements.

Another approach of reducing the size of intra-coded image frames is disclosed in US 2020/021817 A1, wherein coding techniques using Position Dependent (Intra) Prediction Combination (PDPC) with wide angle intra prediction are described. Specifically, it is described how to determine a prediction block for a current block of a current picture using a wide angle intra prediction, and then how to use the PDPC to modify a prediction sample of the prediction block. Further, it is described how to determine a residual value for a residual block based on the modified prediction sample and a sample value in the current block, and how to signal information indicative of the residual value.

US 2011/002385 A1 discloses an image coding apparatus which divides an input picture into a plurality of macroblocks and determines whether a macroblock is a flat macroblock based on calculated flatness for pixel values contained in the macroblock. If the macroblock is determined to be a flat macroblock and belongs to a flat area, the apparatus comprises a unit for selecting one of the inter-prediction mode and the intra-prediction mode as a prediction mode for encoding the macroblock based on determination result and based on cost values of the inter-prediction mode and the intra-prediction mode. The apparatus comprises further a unit for performing predictive coding according to the selected prediction mode.

The article "AHG6: A threshold for SAO edge offset" (Sugio T et al. no. JCTVC-J0213 10 Jul. 2012 (2012-07-10), XP03020234791) proposes a threshold for SAO EO in order to control the categorization for a strong edge and a weak edge to improve the flexibility in terms of a subjective quality and an objective quality.

SUMMARY

In view of the above, mitigating the above problems and provide techniques for reducing the size of an intra-coded image frame, i.e., of an I-frame.

According to a first aspect, a method, performed by an image pipeline, for intra-coding an image frame, wherein the image pipeline comprises a processing part followed by an encoding part supporting a plurality of intra-prediction modes used for intra-coding image frames. The method comprises, by means of the processing part, receiving an image frame, and for at least one block of pixel values in the image frame, predicting pixel values of the at least one block of pixel values using an intra-prediction mode supported by the encoding part, reducing a residual between at least one pixel value within the at least one block of pixel values and a corresponding predicted pixel value by adjusting the at least one pixel value within the at least one block of pixel values by a predefined amount up within the pixel value range when the corresponding predicted pixel value is larger than the at least one pixel value or by the predefined amount down within the pixel value range when the corresponding predicted pixel value is smaller than the at least one pixel value, and updating the image frame with the adjusted at least one pixel value within the at least one block of pixel values. Further, the method comprises, by means of the encoding part, intra-coding the updated image frame using at least one out of the plurality of intra-prediction modes, wherein the intra-coding comprises: for each block of pixel values in the updated image frame, predicting pixel values and calculating residuals using one or more of the intra-prediction modes supported, and selecting, for intra-coding of each respective block of pixel values, the intra-prediction mode giving the lowest residual for the respective block of pixel values.

The processing part preceding the encoding part in the image pipeline thus updates the image frame by adjusting the at least one pixel value by a predefined amount up or down within a pixel value range so as to reduce the residual between the at least one pixel value and the corresponding predicted pixel value. The predefined amount may be 1 or 2 steps up or down within the pixel value range. For example, in a video stream having 8 bits per pixel (bpp), the at least one pixel value is an integer in the range from 0 to 255, and in a video stream having 10 bpp, the pixel value range is from 0 to 1023. Thus, it should be understood that the pixel value range depends on the number of bits per pixel of the video stream and may be another range than the ranges given above as examples. Since the processing part predicts the corresponding predicted pixel value using one of the intra-prediction modes supported by the encoding part and then adjust the at least one pixel value to reduce the residual, it is more likely that the encoding part will use the same one of the intra-prediction modes when performing the prediction of pixel values in the intra-coding of the updated image frame and thus the residual determined by the encoding part will be smaller than it would have been without the adjustment made by the processing part. Thanks to the smaller residual, the size of the intra-coded image frame is reduced as compared to a scenario without the pixel value adjustment performed by the processing part. Accordingly, this method serves to reduce the size of an I-frame.

As used herein, the term intra-coding refers to the encoding of an image frame using one or more intra-prediction modes supported by the encoding part. The one or more intra-prediction modes may be one or more out of the 9 different intra-prediction modes supported by AVC, one or more out of the 35 different intra-prediction modes supported by the compression standard HEVC, and/or one or more out of the 54 different intra-prediction modes supported by the compression standard AV1, just to give some examples. However, other compression standards may support other intra-prediction modes that additionally or alternatively are supported by the encoding part. Further, the supported intra-prediction modes may comprise one or more luminance (luma) intra-prediction modes and/or one or more chrominance (chroma) intra-prediction modes.

By the term block of pixel values is generally meant a unit of pixel values, e.g., a processing unit of pixel values, that is used in the compression. For example, the processing unit may be used in image and video compression formats based on linear block transforms, typically the Discrete Cosine Transform (DCT). The block may sometimes be referred to as a prediction block or a transform block depending on whether it is used in prediction or in compression. The block may be a part of a so-called macroblock. In the AVC compression standard, the block of pixel values typically comprises 4×4 pixel values or 8×8 pixel values. However, it should be understood that the block size may be another such as 16×16 or 32×32 or it may be a macroblock-based size depending on the compression standard. Thus, it should be understood that the number of pixel values within the block of pixel values may vary depending on e.g., the compression technique used.

As mentioned above, by the term residual when used in this disclosure is meant the difference between the real pixel value and the predicted pixel value. Sometimes, the residual is expressed as the absolute value of the difference between the real pixel value and the predicted pixel value.

In some variants of the method, the method further comprises the step of identifying at least one region of non-interest in the image frame, wherein the at least one block of pixel values is comprised in the at least one region of non-interest.

By the term region of non-interest when used in this disclosure is meant a region different from a region of interest, ROI, which ROI comprises one or more objects or details of interest. In other words, a region of non-interest is a region not comprising any objects or details of interest, such as a background region. For example, the region of non-interest may be a region comprising a part of the sky, a sea, a forest, a lawn or other vegetation, just to give some examples.

Thus, the adjustment of the at least one pixel value comprised in a block in the region of non-interest to reduce the residual between the pixel value and a corresponding predicted pixel value as mentioned above would have the advantage of giving a better match with the intra-prediction mode the encoder will use in the subsequent encoding of the image frame without affecting the image quality of the encoded image frame since the adjustment of the at least one pixel value does not affect any object or details of interest.

Identification of the at least one region of non-interest may be accomplished in several ways, some of which will be described below with reference to a first and a second group of embodiments.

In the first group of embodiments, the identifying of the at least one region of non-interest in the image frame comprises partitioning the image frame into image segments, classifying the image segments, and identifying at least one of the image segments to be the at least one region of non-interest when the at least one of the image segments belongs to a group of predetermined classes.

One or more of the above-mentioned steps of partitioning, classifying and identifying may be performed by an image segmentation procedure wherein a label is assigned to every pixel in the image frame such that pixels with the same label share certain characteristics and are considered to belong to the same image segment. The label may be associated with or indicative of one of the predetermined classes. Typically, the result of image segmentation is a set of image segments that collectively cover the entire image frame. One example of an image segmentation procedure is semantic segmentation. Some other examples of image segmentation procedures are motion-based segmentation, and segmentation based on threshold values, histograms, or based on clustering methods, or other procedures for determining some areas of the image to be of more importance than others due to the existence of objects, people, or motion in those areas and classifying those areas as ROIs and the other areas as region of non-interest.

The group of predetermined classes may comprise classes defining homogeneous image segments i.e., image segments being mostly uniform in composition such as mostly uniform in colour and/or texture, or image segments having a spatial variability below a threshold. For example, the group of predetermined classes may comprise classes such as sky and vegetation and/or subclasses such as daytime sky, nighttime sky, cloud, and tree, shrub and grass, respectively.

In the first group of embodiments, the processing part may select the intra-prediction mode based on the group of predetermined classes. Thanks to the segmentation into classes an intra-prediction mode more suitable for a certain class may be more easily selected.

In some variants of the method, the processing part calculates predicted pixel values for each pixel value in the at least one block of pixel values using at least two of the plurality of intra-prediction modes and selects the intra-prediction mode of the at least two of the plurality of intra-prediction modes giving a smallest sum of absolute values of the residuals between the pixel values and the corresponding predicted pixel values. By selecting the intra-prediction mode having the smallest sum of absolute values of the residuals, the likelihood increases that the encoding part will select the same intra-prediction mode when performing the intra-prediction of the image frame resulting in an even lower encoded frame size as compared to a scenario wherein the encoding part selects the other one of the two intra-prediction modes.

In the second group of embodiments, the identifying of the at least one region of non-interest in the image frame comprises determining a spatial variability of pixel values comprised in at least one region of the image frame, and identifying the at least one region of non-interest to be a region comprising pixel values having a spatial variability below a region threshold value. By the spatial variability being below a region threshold value it is indicated that the region is homogeneous, i.e. does not comprise an object or details of interest. Therefore, it is advantageous to identify that region as the region of non-interest.

The at least one block of pixel values comprised in the region of non-interest may have a spatial variability of pixel values above a block threshold value. Thus, when selecting the block wherein the at least one pixel value is to be adjusted it is advantageous to select a block wherein the spatial variability is above the block threshold values since in such a block the pixel value can be adjusted more to obtain a reduced encoded frame size without impairing the image quality.

In some variants of the method, the adjusting of the at least one pixel value within the at least one block of pixel values comprises adjusting the at least one pixel value within the at least one block of pixel values to reduce the spatial variability of the pixel values below the block threshold value. Thereby, the residual for at least one pixel value will also be reduced.

In some variants of the method, the intra-prediction mode used by the processing part is selected from a subset of the plurality of intra-prediction modes supported by the encoding part.

The method may further comprise, by means of the processing part, calculating the residual between the pixel values and the corresponding predicted pixel values, and selecting the at least one pixel value to be adjusted to be a pixel value for which an absolute value of the calculated residual is larger than a pixel threshold value. The adjusting of the at least one pixel value within the at least one block of pixel values may comprise adjusting the at least one pixel value within the at least one block of pixel values so that an absolute value of the residual is equal to or below the pixel threshold value. By comparing the pixel value against a pixel value threshold, pixel values that might result in increased encoded frame size and spikes in the encoded bit streams if not adjusted could be selected for adjustment. Thereby, a reduced encoded frame size may be obtained.

The predefined amount may be 1 or 2 steps up or down within a pixel value range. For example, in a video stream having 8 bits per pixel (bpp), the at least one pixel value is an integer in the range from 0 to 255, and in a video stream having 10 bpp, the pixel value range is from 0 to 1023. Thus, it should be understood that the pixel value range depends on the number of bits per pixel of the video stream and may be another range than the ranges given above as examples.

In some variants of the method, the adjusting of the at least one pixel value comprises adjusting the at least one pixel value within the at least one block of pixel values to be equal to a neighbouring pixel value. Thereby, the subsequent encoding of the image frame will be simplified since the neighbouring pixels having the same pixel value can be encoded in the same way. For example, this may be advantageous for a vertical intra-prediction mode (e.g., AVC mode 0) or a horizontal intra-prediction mode (e.g., AVC mode 1).

In some variants of the method, the adjusting of the at least one pixel value comprises adjusting one or more but not all of the pixel values within the at least one block of pixel values. Typically, the number of pixel values to be adjusted is kept as low as possible to obtain the sought-after reduction in encoded frame size while at the same time avoid deteriorating the image quality of the encoded image frame.

According to a second aspect, an image pipeline for intra-coding an image frame comprises a processing part followed by an encoding part configured to support a plurality of intra-prediction modes used for intra-coding image frames. The processing part is configured to receive an image frame; and configured to, for at least one block of pixel values in the image frame, predict pixel values of the at least one block of pixel values using an intra-prediction mode supported by the encoding part, reduce a residual between at least one pixel value within the at least one block of pixel values and a corresponding predicted pixel value by adjusting at least one pixel value within the at least one block of pixel values by a predefined amount up within the pixel value range when the corresponding predicted pixel value is larger than the at least one pixel value or by the predefined amount down within the pixel value range when the corresponding predicted pixel value is smaller than the at least one pixel value, and update the image frame with the adjusted at least one pixel value within the at least one block of pixel values. The encoding part is configured to intra-code the updated image frame using at least one out of the plurality of intra-prediction modes by being configured to: for each block of pixel values in the updated image frame, predict pixel values and calculate residuals using one or more of the intra-prediction modes supported, and to select, for intra-coding of each respective block of pixel values, the intra-prediction mode giving the lowest residual for the respective block of pixel values.

According to a third aspect, a non-transitory computer-readable medium having stored thereon computer code instructions carries out the method of the first aspect when executed by a device having processing capability.

The second and third aspects may generally have the same features and advantages as the first aspect. It is further noted that the invention relates to all possible combinations of features disclosed herein unless explicitly stated otherwise.

BRIEF DESCRIPTION OF THE DRAWINGS

The above, as well as additional objects, features and advantages will be better understood through the following illustrative and non-limiting detailed description of embodiments, with reference to the appended drawings, where the same reference numerals will be used for similar elements, wherein.

DETAILED DESCRIPTION

The present embodiments will be described more fully hereinafter with reference to the accompanying drawings.

Figure 1:
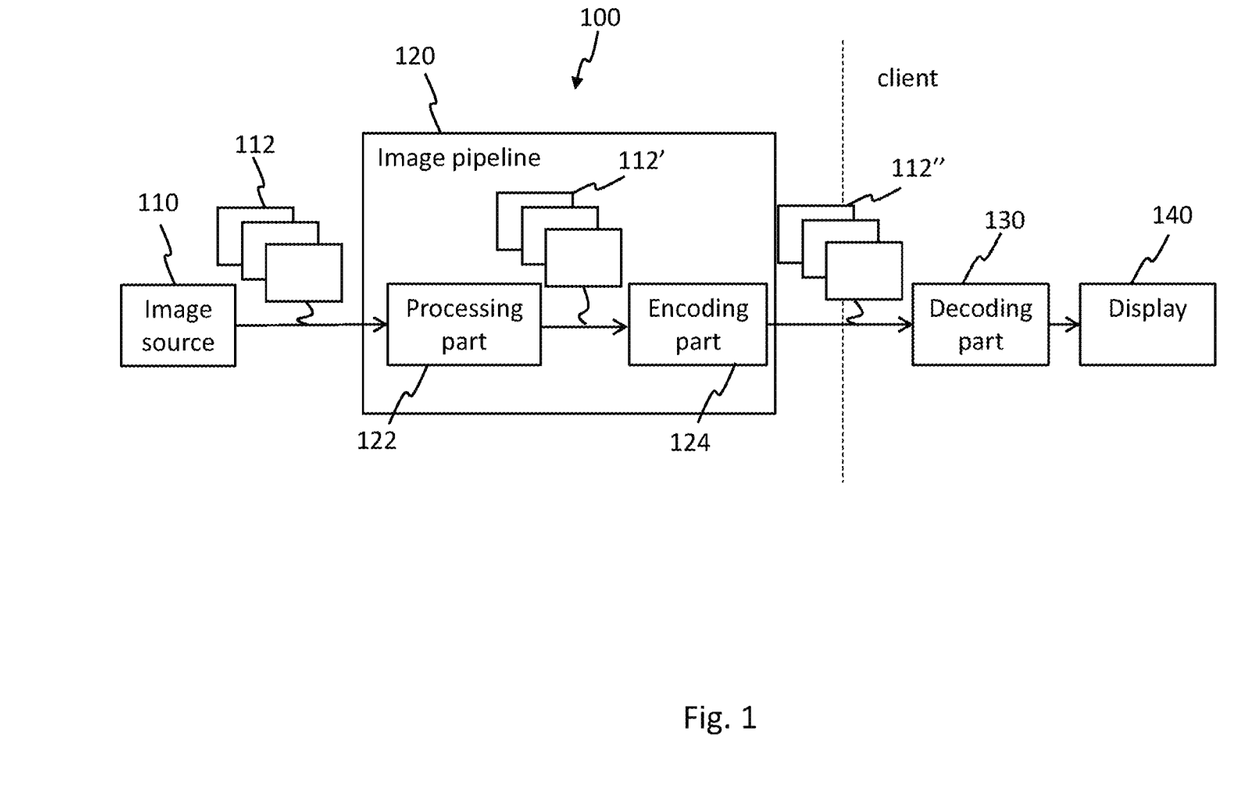
FIG. 1 schematically illustrates an imaging system comprising an image pipeline according to embodiments.

FIG. 1 illustrates an embodiment of an imaging system 100. The imaging system 100 comprises an image source 110, and an image pipeline 120 for intra-coding one or more image frames 112.

The image source 110 may be or may comprise an image sensor (not shown) configured to capture one or more image frames of a scene. The image source 110 may form part of a video camera, such as a surveillance camera. Alternatively, or additionally, the image source 110 may be an image rendering engine. The image rendering engine is configured to render the image frames. The image rendering engine may be configured to render photorealistic or non-photorealistic image frames from a 2D model or a 3D model by means of computer program. Alternatively, or additionally, the image source 110 may be a storage configured to store one or more image frames received from an image sensor (not shown) arranged external of and in communication with the image source 110. Further, the image source 110 may be configured to transfer image frames 112 to the image pipeline 120. The image pipeline 120 may form part of the video camera, such as the surveillance camera, mentioned above. Thus, in some embodiments, the video camera comprises the imaging system 100.

As illustrated in FIG. 1, the image pipeline 120 comprises a processing part 122 and an encoding part 124. The processing part 122 is arranged to precede the encoding part 124 in the image pipeline 120, and thus the encoding part 124 is arranged to succeed the processing part 122. The encoding part 124 is configured to support a plurality of intra-prediction modes used for intra-coding an image frame. The image pipeline 120 may also comprise receiving and transmitting parts (not shown) configured to receive image frames from the image source 110 and to transmit image frames to a client device.

Thus, the image pipeline 120 is configured to process one or more image frames 112 received from the image source 110 and to transmit processed and encoded image frames 112" in one or more bitstreams to one or more clients, e.g., over a wireless or wired communications network (not shown). Especially, the image pipeline 120 is configured to process image frames to reduce the encoded frame size of intra-coded image frames, i.e., the encoded frame size of the I-frames transmitted from the encoding part 124 in the one or more bitstreams. As also illustrated in FIG. 1, each client may have a decoding part 130 configured to decode the received bitstream of encoded image frames 112" and to present the decoded image frames on a display device 140, such as on a video monitor.

Figure 2:
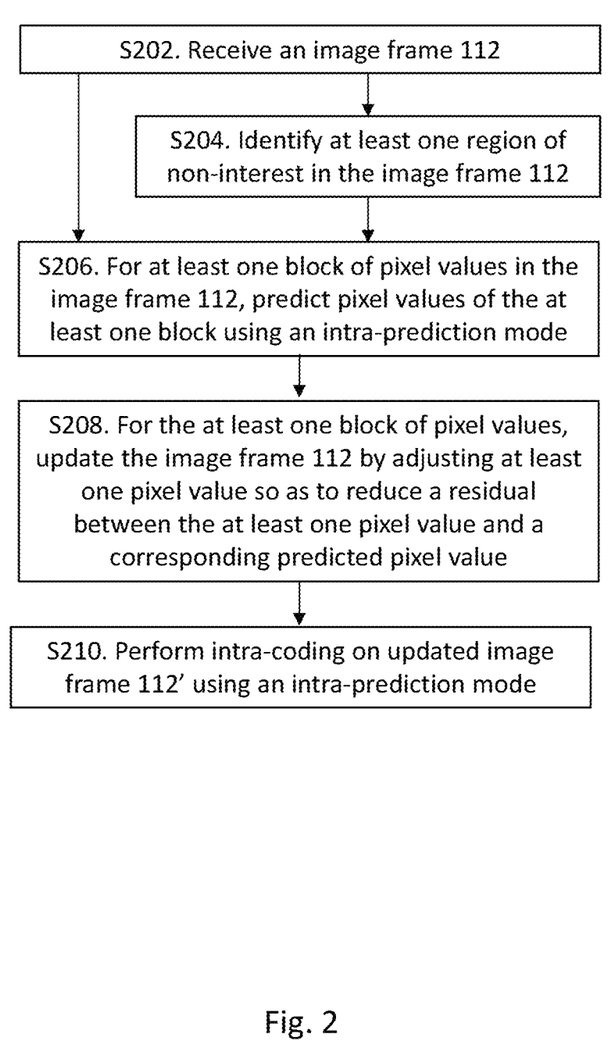
FIG. 2 is a flowchart of a method for intra-coding an image frame according to embodiments.

A method for intra-coding an image frame 112 will now be described with reference to the flowchart of FIG. 2. The method may be performed by the image pipeline 120 of the imaging system 100. The method or one or more steps thereof may be performed independently in several parts of the image pipeline 110. For purposes of illustration, it is in the following assumed that the steps of the method are performed by the processing part 122 or the encoding part 124 of the image pipeline 120. However, examples of performing some steps of the method in another part, such as in a pre-processing part (not shown), will also be given. Further, it should be noted that some of the steps may be optional and that steps may be taken in another suitable order. Furthermore, in this disclosure one or more steps are described as being performed on at least one block of pixel values. This should be understood as one or more steps may be performed on a plurality of blocks of pixel values, e.g. all blocks of pixel values, of an image frame or of a part of the image frame.

In step S202, the processing part 122 receives the image frame 112. As mentioned above, the processing part 122 may obtain the image frame 112 from the image source 110. In this disclosure, the image frame 112 is a frame that is to be intra-coded, i.e. the frame is to be encoded using intra mode compression.

In an optional step S204, at least one region of non-interest in the image frame 112 is identified. The at least one region of non-interest comprises at least one block of pixel values. As will be described in more detail below with reference to the steps S206 and S208, the image frame 112 will be updated by adjusting at least one pixel value of the least one block of pixel values to reduce a residual between the at least one pixel value and a corresponding predicted pixel value. By adjusting the at least one pixel value in a region of non-interest, the possible drawback of a deteriorated image quality is not so serious since it is occurring in the non-interesting region of the image frame 112 and would not negatively impact the viewing experience. Therefore, in some embodiments, the least one block of pixel values is selected to be comprised in the region of non-interest.

The at least one region of non-interest may be identified in several ways by the image pipeline 120. For example, the at least one region of non-interest may be identified by the processing part 122 but it may alternatively be identified by another part of the image pipeline 120 such as by a pre-processing part (not shown) preceding the processing part 122.

In a first group of embodiments, the image pipeline 120 may identify the at least one region of non-interest in the image frame 112 by partitioning the image frame 112 into image segments, classifying the image segments and identifying at least one of the image segments to be the at least one region of non-interest when the at least one of the image segments belongs to a group of predetermined classes. For example, the group of predetermined classes may comprise classes such as sky and vegetation and/or subclasses such as daytime sky, night-time sky, cloud, and tree, shrub and grass, respectively.

In a second group of embodiments, the image pipeline 120 may identify the at least one region of non-interest in the image frame 112 by determining a spatial variability of pixel values comprised in at least one region of the image frame 112, and identifying the at least one region of non-interest to be a region comprising pixel values having a spatial variability below a region threshold value. Thus, the region threshold value may be a value below which the spatial variability is low enough to consider the region to be of non-interest. For example, the region threshold value may be the value corresponding to the tenth percentile of the spatial variability of the pixels in the frame, whereby statistically ten percent of all pixel values will be below the region threshold value and may thus be considered to belong to the region of non-interest. The spatial variability for a region may be the variance or standard deviation of pixel values in the region.

Alternatively, or additionally, the at least one block of pixel values comprised in the region of non-interest may have a spatial variability of pixel values above a block threshold value. If several blocks within the region of non-interest have a spatial variability of pixel values above the block threshold value, the block having the largest spatial variability out of the several blocks may be selected. Then the processing part 122 may adjust the at least one pixel value within the at least one block of pixel values to reduce the spatial variability of the pixel values below the block threshold value. For example, the block threshold value may be set to a value close to the spatial variability of the block, such as to a value within the range of ±1-10, e.g. within ±1-5, per cents of the spatial variability of the block. The spatial variability for a block may be the variance or standard deviation of pixel values in the block. This may be used in intra-prediction modes using a mean value of upper and left-hand samples, such as in the AVC intra-prediction mode 2 (DC).

In step S206, the processing part 122 predicts pixel values for at least one block of pixel values in the image frame 112 by using an intra-prediction mode supported by the encoding part 124. As previously mentioned, the at least one block of pixel values may be comprised in a region of the image frame such as a region of non-interest. Further, the processing part 122 may predict pixel values for all blocks of pixel values comprised in the region of the image frame, e.g., in the region of non-interest.

As previously mentioned, the encoding part 124 supports a plurality of intra-prediction modes. Thus, for the prediction of pixel values, i.e. for the intra-prediction, the processing part 122 should use one out of the plurality of intra-prediction modes support by the encoding part 124. For example, the encoding part 124 may support one or more out of the 9 different intra-prediction modes supported by AVC, one or more out of the 35 different intra-prediction modes supported by the compression standard HEVC, and/or one or more out of the 54 different intra-prediction modes supported by the compression standard AV1, just to give some examples.

In the first group of embodiments, the processing part 122 may select the intra-prediction mode, out of the plurality of intra-prediction modes supported by the encoding part 124, based on the group of predetermined classes. Thus, the processing part 122 may be configured to select the intra-prediction mode based on classification of the image segment. If the classification indicates that the region is homogeneous, an intra-prediction mode suitable for homogeneous regions should be selected and used.

Alternatively, in the second group of embodiments, the processing part 122 may select the intra-prediction mode, out of the plurality of intra-prediction modes supported by the encoding part 124, based on the spatial variability. For example, if the spatial variability is below the region threshold value that may indicate that the region is homogeneous and that an intra-prediction mode suitable for homogeneous regions should be selected and used. However, it should be understood that different intra-prediction modes suitable for homogeneous regions may be used for different homogeneous regions. Thus, the same intra-prediction mode does not need to be used for all homogeneous regions. For example, one or more additional region threshold values being successively lower than the region threshold value may be available, and when the spatial variability is below one of the one or more additional region threshold values that may indicate that another intra-prediction mode suitable for homogeneous regions should be used. For example, that may indicate that the intra-prediction mode 2 (DC) should be used instead of intra-prediction mode 0 or mode 1.

Figure 3:
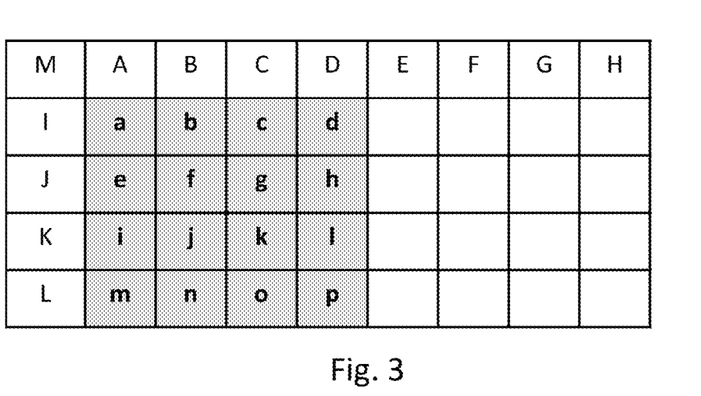
FIG. 3 schematically illustrates labelling of predicted pixel values in a block comprising 4×4 pixels.

FIG. 3 illustrates an example wherein the predicted pixel values in a block comprising 4×4 pixels are labelled a-p and the pixel values on top and to the left of the block are labelled M, A-H, and I-L, respectively. Depending on the intra-prediction mode used, the pixel values on top and/or to the left of the block are used for predicting the pixel values a-p.

Figure 4:
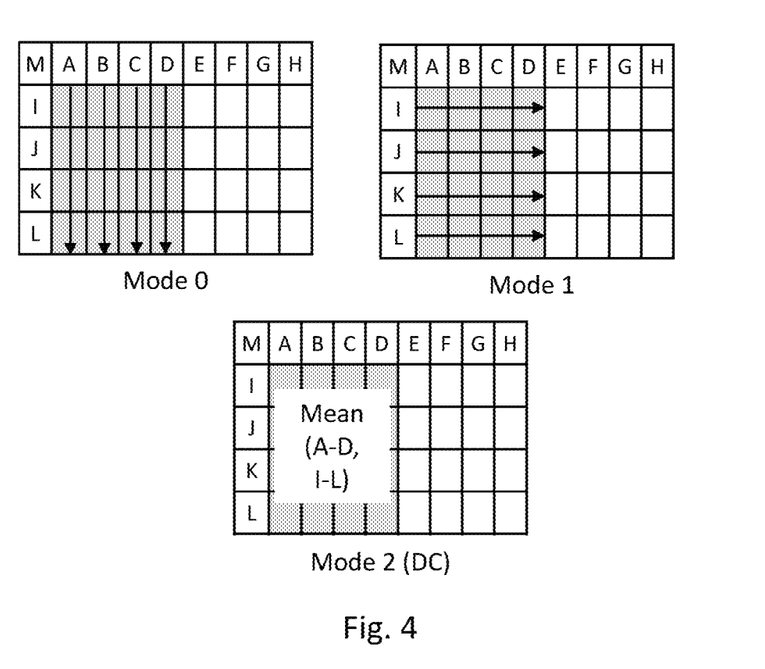
FIG. 4 schematically illustrates three intra-prediction modes, i.e. mode 0, mode 1 and mode 2, of the compression standard AVC.

FIG. 4 schematically illustrates the three first intra-prediction modes, i.e., mode 0, mode 1 and mode 2 (also referred to as DC mode), out of the nine intra-prediction modes for the compression standard AVC. In each of the intra-prediction modes, i.e., mode 0, mode 1 and mode 2, it is shown how the pixel values on top and/or to the left of the block are used for predicting the pixel values a-p.

In AVC intra-prediction mode 0, the pixel value on top of the respective column of pixel values in the block will be used for the prediction giving all pixel values in the same column the same predicated pixel value. Thus, the pixel values a, e, i, and m will be predicted to have the pixel value A; the pixel values b, f, j, and n will be predicted to have the pixel value B, the pixel values c, g, k, and o will be predicted to have the pixel value C; and the pixel values d, h, l, and p will be predicted to have the pixel value D.

In AVC intra-prediction mode 1, the pixel value on the left of the respective row of pixel values in the block will be used for the prediction giving all pixel values in the same row the same predicted pixel value.

In AVC intra-prediction mode 2, the mean value of the pixel values on the left and on the top of the pixel values in the block will be used for the prediction giving all pixel values in the block the same pixel value. In our example shown in FIG. 4 all pixel values of the block with be predicted to have the mean value of the pixel values A-D and I-L.

For a homogeneous region or a region comprising pixel values having a low spatial variability, i.e., being below the region threshold value, one out of the three first modes, i.e., mode 0, mode 1, or mode 2 (DC), of the intra-prediction modes supported by AVC may be suitable to select for the prediction of the pixel values in the at least one block of pixel values.

In another alternative, the processing part 122 may calculate predicted pixel values for each pixel value in the at least one block of pixel values using at least two of the plurality of intra-prediction modes and to select the intra-prediction mode of the at least two of the plurality of intra-prediction modes giving a smallest sum of absolute values of the residuals between the pixel values and the corresponding predicted pixel values. Thus, it should be understood that the processing part 122 may calculate predicted pixel values for each pixel value in the at least one block of pixel values using all of the plurality of intra-prediction modes supported. In such scenario, the processing part 122 may select the intra-prediction mode of the plurality of intra-prediction modes giving a smallest sum of absolute values of the residuals between the pixel values and the corresponding predicted pixel values.

In some embodiments, the processing part 122 may use a number of intra-prediction modes supported by the encoding part 124. In such embodiments, the processing part 122 may select one of the number of supported intra-prediction modes. For example, the processing part 122 may select the intra-prediction mode from a subset of the plurality of intra-prediction modes supported by the encoding part 124. The subset of the plurality of intra-prediction modes may be a proper subset, and may thus not include all of the intra-prediction modes supported by the encoding part 124.

Returning now to FIG. 2, in step S208 the processing part 122 updates the image frame 112 by adjusting at least one pixel value within the at least one block of pixel values in the image frame 112 so as to reduce a residual between the at least one pixel value and a corresponding predicted pixel value. This may also be expressed as the processing part 122, in step S208, reduces the residual between the at least one pixel value within the at least one block of pixel values and the corresponding predicted pixel value by adjusting the at least one pixel value within the at least one block of pixel values, and updates the image frame with the adjusted at least one pixel value within the at least one block of pixel values.

The processing part 122 may adjust the at least one pixel value within the at least one block of pixel values by a predefined amount up or down within the pixel value range in order to reduce the residual. For example, when the corresponding predicted pixel value is larger than the at least one pixel value, the processing part 122 adjusts the at least one pixel value within the at least one block of pixel values by a predefined amount up within the pixel value range in order to reduce the residual. In correspondence and in order to reduce the residual when the corresponding predicted pixel value is smaller than the at least one pixel value, the processing part 122 adjusts the at least one pixel value within the at least one block of pixel values by a predefined amount down within the pixel value range.

It should be noted that it is not an aim to reduce the residual completely, i.e., to zero, and that is typically not the case either since a complete reduction of the residual results in a too large loss of image information. Instead, it is noted that even a smaller reduction of the residual increases the possibility that the encoding part 124 at a later stage encodes the image frame updated with the adjusted at least one pixel value with the intra-prediction mode used by the processing part 122 for the prediction. The encoding of the updated image frame 112' with the same intra-prediction mode will result in a reduced encoded frame size of the I-frame as compared to the I-frame resulting from the encoding of the original, not updated, image frame 112.

The processing part 122 may also select the at least one pixel value to be adjusted. For example, this may be done by the processing part 122 calculating the residual between the pixel values and the corresponding predicted pixel values, and selecting the at least one pixel value to be adjusted to be a pixel value for which an absolute value of the calculated residual is larger than a pixel threshold value. Thus, if the absolute value of the difference is larger than the pixel threshold value for a specific pixel value, that pixel value may be selected for adjustment. In case several pixel values have absolute differences larger than the pixel threshold value at least one of those pixel values or all of them may be adjusted. For example, the pixel threshold value may be set to a value close to the spatial variability of the block, such as to a value within the range of ±1-10, e.g., within ±1-5, per cents of the spatial variability of the block. This may be used in intra-prediction modes using a mean value of upper and left-hand samples; such as in the AVC intra-prediction mode 2 (DC).

When the pixel value has been selected it should be adjusted, and the adjustment may be performed in different ways. For example, the processing part 122 may adjust the at least one pixel value within the at least one block of pixel values so that an absolute value of the residual is equal to or below the pixel threshold value.

Alternatively, or additionally, the processing part 122 may adjust the at least one pixel value by a predefined amount. The predefined amount by which the at least one pixel value may be adjusted may be 1 or 2 steps up or down within the pixel value range. As previously mentioned, the pixel value range is 0 to 255 for an 8 bpp video stream and 0 to 1023 for a 10 bpp video stream, just to give two examples.

Alternatively, or additionally, the processing part 122 may adjust the at least one pixel value within the at least one block of pixel values to be equal to a neighbouring pixel value. Thereby, the subsequent encoding of the image frame will be simplified since the neighbouring pixels having the same pixel value may be encoded in the same way. As previously mentioned, this may be advantageous for a vertical intra-prediction mode (e.g., AVC mode 0) or a horizontal intra-prediction mode (e.g., AVC mode 1). Further, this may be advantageous when the adjustment results in a reduced residual, because it may simplify the encoding for the encoding part 126 and it may also require less encoding resources as compared to the case when neighbouring pixel values are different.

However, it should be understood that the processing part 122 may adjust the at least one pixel value within the at least one block of pixel values to be equal to a pixel value that is most favourable for an intra-prediction mode to be used, i.e., to a pixel value giving the smallest residual for the intra-prediction mode to be used.

Further, the processing part 122 may adjust one or more but not all of the pixel values within the at least one block of pixel values. In other words, it is only a proper subset of pixel values out of the total number of pixel values in the at least one block that is adjusted. It should be noted that the proper subset does not include all the pixel values of the block. Thus, the intention is not to replace the block of pixel values by another block of pixel values since that may deteriorate the image quality too much. Instead the intention is to adjust one or more, or only as many pixel values as needed to increase the probability that the encoding part 124 will select the same intra-prediction mode as the processing part 122 used for the prediction of the pixel values. As previously mentioned, if the encoding part 124 selects the same intra-prediction mode as the one used by the processing part 122 the sought-after reduction in encoded frame size is obtained.

In some alternative embodiments, the processing part 122 may adjust all of the pixel values within the at least one block of pixel values as long as the residual for at least one pixel is not reduced to zero, i.e. as long as the residual for at least one pixel is larger than zero and smaller than the pixel threshold value.

In step S210, the encoding part 124 performs intra-coding on the updated image frame 112' using at least one out of the plurality of intra-prediction modes. The intra-coding, performed by the encoding part 124, is in accordance with standard techniques and comprises: for each block of pixel values in the updated image frame, predicting pixel values and calculating residuals using one or more of the intra-prediction modes supported, and selecting, for intra-coding of each respective block of pixel values, the intra-prediction mode giving the lowest residual for the respective block of pixel values. As known to a skilled person in the art, the encoding part 124 will encode different blocks of the updated image frame 112' differently depending on the region in which the block is located. For example, if the block is located in a homogenous region, the AVC mode 2 (DC) may give the smallest residual and thus it may be selected. As another example, if the block is located in a region comprising a vertical pattern, the AVC mode 0 (vertical) may give the smallest residual and therefore it may be selected. Thus, the encoding part 125 may use different intra-prediction modes for encoding different blocks of the updated image frame 112'. For example, if the block of the updated image frame 112' is comprised in a ROI, the encoding part 124 will perform the intra-coding using an intra-prediction mode suitable for encoding objects or details, and if the block is comprised in a region of non-interest, the encoding part 124 will perform the intra-coding using an intra-prediction mode suitable for encoding a region of non-interest, e.g., one out of mode 0, mode 1 or mode 2 of the AVC. Since the encoding part 124 will calculate residuals using one or more of the intra-prediction modes supported, and select the intra-prediction mode giving the lowest residual for the intra-coding, the likelihood of the encoding part 124 selecting the same intra-prediction mode as the one used by the processing part 122 is increased after the adjustment of the at least one pixel value since the result of the adjustment is a reduced residual for the chosen intra-prediction mode. Therefore, if the encoding part 124 selects the same intra-prediction mode as the one used by the processing part 122, the size of the encoded image frame 122" will be reduced. Further, thanks to the encoding part 124 being operating in accordance with standard techniques, a standard decoding part 130, e.g., a legacy decoding part, is able to decode the received bitstream of encoded image frames 112" without requiring any modifications of the decoding part 130. Thus, the encoding part 124 is compatible with a standard decoding part.

As described above, the image pipeline 120 may be configured to implement a method for intra-coding the image frame 112. For this purpose, the image pipeline 120 may include circuitry which is configured to implement the various method steps described above.

In a hardware implementation, the circuitry may be dedicated and specifically designed to implement one or more of the method steps. The circuitry may be in the form of one or more integrated circuits, such as one or more application specific integrated circuits or one or more field-programmable gate arrays. By way of example, the image pipeline 120 may hence comprise circuitry which, when in use, predicts pixel values of the at least one block of pixel values and adjusts at least one of the pixel values using an intra-prediction mode support by the encoding part 124.

In a software implementation, the circuitry may instead be in the form of a processor, such as a microprocessor, which in association with computer code instructions stored on a (non-transitory) computer-readable medium, such as a non-volatile memory, causes the image pipeline 120 to carry out any method disclosed herein. Examples of non-volatile memory include read-only memory, flash memory, ferroelectric RAM, magnetic computer storage devices, optical discs, and the like. In a software case, each of the method steps described above may thus correspond to a portion of computer code instructions stored on the computer-readable medium, that, when executed by the processor, causes the image pipeline 120 to carry out any method disclosed herein.

It is to be understood that it is also possible to have a combination of a hardware and a software implementation, meaning that some method steps are implemented in hardware and others in software.

It will be appreciated that a person skilled in the art can modify the above-described embodiments in many ways and still use the advantages as shown in the embodiments above. For example, the image pipeline 120 does not need to be a single unit comprising the processing part 122 and the encoding part 124 at one location but it could be a virtual unit, wherein the processing part 122 and the encoding part 124 operates together but they are provided at different locations. Alternatively, the processing part 122 may be an integrated part of the encoding part 124. Further, a possible pre-processing part may be arranged external of the image pipeline 120, e.g., between the image source 110 and the image pipeline 120. Thus, the teachings should not be limited to the shown embodiments but should only be defined by the appended claims. Additionally, as the skilled person understands, the shown embodiments may be combined.

The invention claimed is:

1. A method, performed by an image pipeline, for intra-coding an image frame, wherein the image pipeline comprises a processing part followed by an encoding part supporting a plurality of intra-prediction modes used for intra-coding image frames, and wherein the method comprises:
by means of the processing part performing the steps of:
receiving an image frame;
for at least one block of pixel values in the image frame:
predicting pixel values of the at least one block of pixel values using an intra-prediction mode supported by the encoding part;
reducing a residual between at least one pixel value within the at least one block of pixel values and a corresponding predicted pixel value by adjusting the at least one pixel value within the at least one block of pixel values by a predefined amount up within a pixel value range when the corresponding predicted pixel value is larger than the at least one pixel value or by the predefined amount down within the pixel value range when the corresponding predicted pixel value is smaller than the at least one pixel value, and
updating the image frame with the adjusted at least one pixel value within the at least one block of pixel values; and
by means of the encoding part performing the step of:
intra-coding the updated image frame using at least one out of the plurality of intra-prediction modes, wherein the intra-coding comprises:
for each block of pixel values in the updated image frame, predicting pixel values and calculating residuals using one or more of the intra-prediction modes supported, and
selecting, for intra-coding of each respective block of pixel values, the intra-prediction mode giving the lowest residual for the respective block of pixel values.

2. The method of claim 1, further comprising:
identifying at least one region of non-interest in the image frame, and wherein the at least one block of pixel values is comprised in the at least one region of non-interest.

3. The method of claim 2, wherein the identifying of the at least one region of non-interest in the image frame comprises:
partitioning the image frame into image segments;
classifying the image segments; and
identifying at least one of the image segments to be the at least one region of non-interest when the at least one of the image segments belongs to a group of predetermined classes.

4. The method of claim 3, wherein the intra-prediction mode used by the processing part is selected based on the group of predetermined classes.

5. The method of claim 1, further comprising:
by means of the processing part, calculating predicted pixel values for each pixel value in the at least one block of pixel values using at least two of the plurality of intra-prediction modes and selecting the intra-prediction mode of the at least two of the plurality of intra-prediction modes giving a smallest sum of absolute values of the residuals between the pixel values and the corresponding predicted pixel values.

6. The method of claim 2, wherein the identifying of the at least one region of non-interest in the image frame comprises:
determining a spatial variability of pixel values comprised in at least one region of the image frame; and
identifying the at least one region of non-interest to be a region comprising pixel values having a spatial variability below a region threshold value.

7. The method of claim 2, wherein the at least one block of pixel values comprised in the region of non-interest has a spatial variability of pixel values above a block threshold value.

8. The method of claim 7, wherein the adjusting of the at least one pixel value within the at least one block of pixel values comprises:
adjusting the at least one pixel value within the at least one block of pixel values to reduce the spatial variability of the pixel values below the block threshold value.

9. The method of claim 1, wherein the intra-prediction mode used by the processing part is selected from a subset of the plurality of intra-prediction modes supported by the encoding part.

10. The method of claim 1, further comprising:
by means of the processing part, calculating the residual between the pixel values and the corresponding predicted pixel values, and selecting the at least one pixel value to be adjusted to be a pixel value for which an absolute value of the calculated residual is larger than a pixel threshold value.

11. The method of claim 10, wherein the adjusting of the at least one pixel value within the at least one block of pixel values comprises:
adjusting the at least one pixel value within the at least one block of pixel values so that an absolute value of the residual is equal to or below the pixel threshold value.

12. The method of claim 1, wherein the adjusting of the at least one pixel value comprises:
adjusting the at least one pixel value within the at least one block of pixel values to be equal to a neighbouring pixel value.

13. The method of claim 1, wherein the adjusting of the at least one pixel value comprises:
adjusting one or more but not all of the pixel values within the at least one block of pixel values.

14. An image pipeline for intra-coding an image frame, wherein the image pipeline comprises a processing part followed by an encoding part configured to support a plurality of intra-prediction modes used for infra-coding image frames, wherein the processing part is configured to:
receive an image frame; and
for at least one block of pixel values in the image frame:
predict pixel values of the at least one block of pixel values using an intra-prediction mode supported by the encoding part; and
reduce a residual between at least one pixel value within the at least one block of pixel values and a corresponding predicted pixel value by adjusting the at least one pixel value within the at least one block of pixel values by a predefined amount up within a pixel value range when the corresponding predicted pixel value is larger than the at least one pixel value or by the predefined amount down within the pixel value range when the corresponding predicted pixel value is smaller than the at least one pixel value, and update the image frame with the adjusted at least one pixel value within the at least one block of pixel values; and wherein the encoding part is configured to:
intra-code the updated image frame using at least one out of the plurality of intra-prediction modes by being configured to:
for each block of pixel values in the updated image frame, predict pixel values and calculate residuals using one or more of the intra-prediction modes supported, and to
select, for intra-coding of each respective block of pixel values, the intra-prediction mode giving the lowest residual for the respective block of pixel values.

15. A non-transitory computer-readable medium having stored thereon computer code instructions adapted to carry out the method of claim 1 when executed by a device having processing capability.

\* \* \* \* \*